No. 774,960.

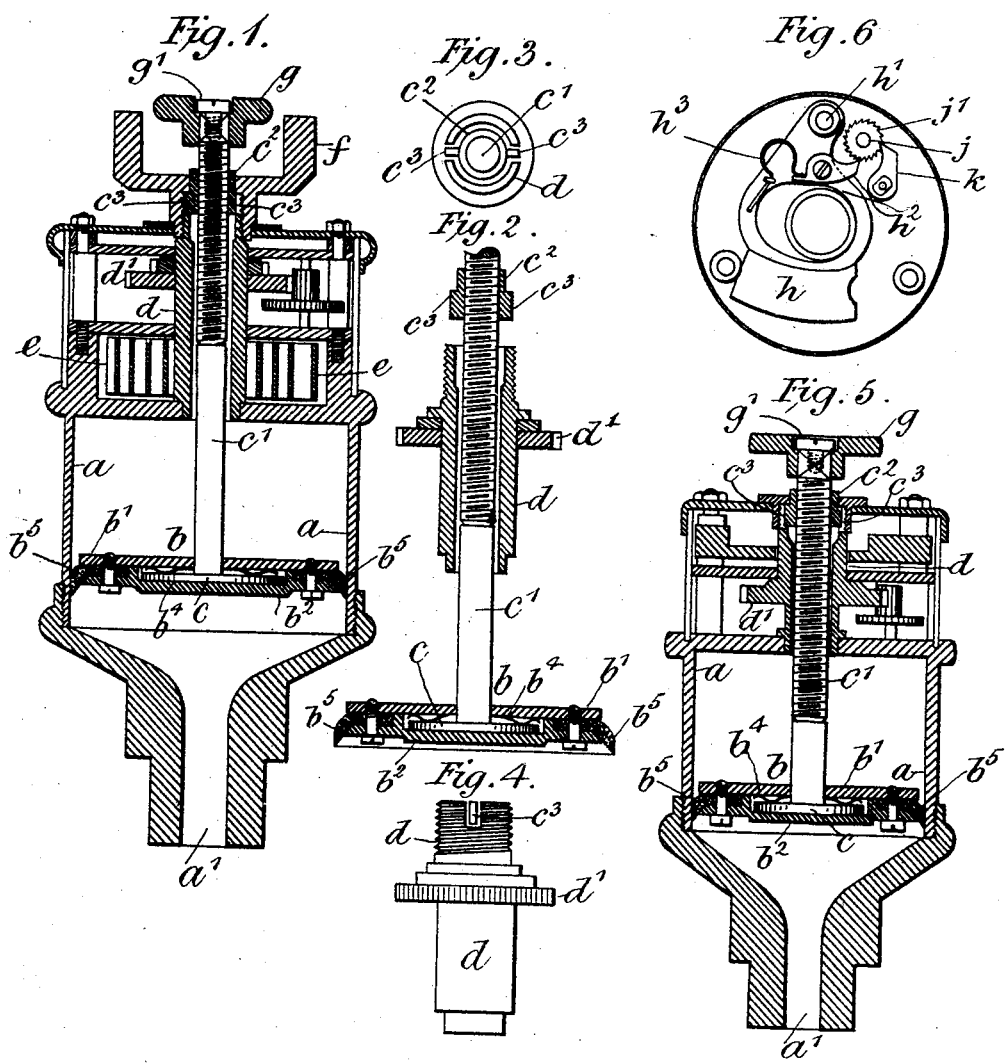

Patented November 15, 1904.

UNITED STATES PATENT OFFICE.

GUSTAV WALCH, OF WIESBADEN, GERMANY.

LUBRICATOR.

SPECIFICATION forming part of Letters Patent No. 774,960, dated November 15, 1904.

Application filed April 8, 1904. Serial No. 202,211. (No model.)

*To all whom it may concern:*

Be it known that I, GUSTAV WALCH, manufacturer, a subject of the German Emperor, residing at Sedanplatz No. 4, Wiesbaden, Germany, have invented certain new and useful Improvements in Lubricators, of which the following is a specification.

This invention relates to lubricators in which grease is expressed from a cup by means of a piston having a screw-threaded piston-rod upon which is a nut driven by clockwork. In lubricators of this type the nut is liable to jam on the piston-rod, owing to one or the other being out of the axial line, and it also often happens that when the piston has arrived at the end of its downward travel the piston-rod gets bent, owing to the continued movement of the clockwork.

The object of this invention is to remedy these defects and also to construct the lubricator in such a manner that one piston-rod can be easily changed for another having a screw of a different pitch for the purpose of altering the rate at which the grease is expressed by the piston.

The invention is illustrated in the accompanying drawings, in which—

Figure 1 is a vertical section of a lubricator driven by a spring. Fig. 2 is a section of the piston and hollow shaft, showing the nut lifted from its seat. Fig. 3 is a plan of the nut and hollow shaft. Fig. 4 is a side elevation of the hollow shaft and driving-wheel. Fig. 5 is a vertical section, and Fig. 6 is a plan, of a similar lubricator driven by a pendulum.

$a$ is a grease-cup. $a'$ is a nozzle-piece screwed to the cup.

$b$ is a piston formed, as shown in Figs. 1 and 2, of a pair of disks $b'$ $b^2$, forming a recess within which is a disk $c$, pressed against the disk $b^2$ by a spring $b^4$.

$b^5$ is a cup-leather.

$c'$ is a screw-threaded piston-rod fixed to the disk $c$.

$c^2$ is a nut on the rod $c'$, having wings $c^3$, which fit into notches formed in a hollow shaft $d$. The nut $c^2$ therefore turns with the shaft, but is otherwise free to move relatively to it.

$d'$ is a toothed wheel fixed to the shaft $d$ and forming the wheel driving the train of clockwork controlled in the usual way by an escapement. For the sake of clearness most of the train and the escapement are omitted from the drawings.

$e$ is the mainspring, one end of which is fixed to the frame and the other end to the shaft $d$, which is driven by it.

$f$ is a key screwing onto the shaft $d$ for winding up the clockwork and for maintaining the nut $c^2$ in position.

$g$ is a button fixed to the square head of the rod $c'$ and secured by a screw $g'$. The button $g$ serves to rotate the rod $c'$ by hand for returning the piston to the top of the cylinder.

When the hollow shaft $d$ is rotated by the mainspring, it turns with it the nut $c^2$, which forces the screw-threaded piston-rod $c'$ downward. The piston-rod $c'$ is normally prevented from turning by the friction between the disks $c$ and $b^2$. When the piston $b$ has arrived at its lowest position, the rod $c'$ can, however, rotate without injuring itself, for the disk $c$ can turn freely within the recess formed by the disks $b'$ $b^2$.

When it is desired to change the piston-rod $c'$ for another rod having a screw-thread of different pitch, the nozzle-piece $a'$ and the screw $g'$ are unscrewed. The button $g$ and key $f$ are then removed, the nut $c^2$ is raised out of the hollow shaft $d$ by pushing the piston $b$ upward from below, and is then unscrewed by pushing downward out of the grease-cup $a$. The piston $b$, with its rod, is now removed and another piston, with a rod having a thread of a different pitch and provided with a corresponding nut, is substituted.

In place of driving the shaft $d$ by a spring it may be driven by a pendulum actuated by the oscillation of some portion of the machine to be lubricated, as shown in Figs. 5 and 6. In these figures, $h$ is a pendulum pivoted at $h'$ and carrying a driving-pawl $h^2$, gearing with a ratchet-wheel $j'$ on the first motion-shaft $j$. $h^3$ is a spring pressing the pawl $h^2$ into gear, and $k$ is a retaining-pawl.

The object of connecting the nut $c^2$ loosely to the shaft $d$ is as follows: The shaft must be allowed a certain play in its bearings in order that it may turn freely, and usually it is inconvenient to fix the driving-wheel $d'$ at the middle of the length of the shaft, and the thrust, therefore, of the driving-wheel tends to force the shaft out of line. The piston also is liable to get out of center, owing to the cup-leather being thicker or harder on one side than the other. If, therefore, the nut is rigidly connected to the driving-wheel or shaft, it is liable to be jammed on the rod and prevent the working of the apparatus.

What I claim is—

1. The combination of a piston, a screw-threaded piston-rod connected to it, a shaft, means for driving the shaft, and a nut on the rod turning with the shaft but free to move relatively to it.

2. The combination of a piston, a screw-threaded piston-rod connected to it, a hollow shaft having slots in it surrounding the rod, means for driving the shaft, and a nut on the rod provided with wings engaging with the slots.

3. The combination of a piston, a screw-threaded piston-rod frictionally connected to it, a shaft, means for driving the shaft, and a nut on the rod turning with the shaft but free to move relatively to it.

4. The combination of a piston, a screw-threaded piston-rod frictionally connected to it, a hollow shaft having slots in it surrounding the rod, means for driving the shaft, and a nut on the rod provided with wings engaging with the slots.

5. The combination of a piston, a screw-threaded piston-rod, a disk fixed to the rod, a spring pressing the piston and disk together, a nut on the rod and means for rotating the nut.

6. The combination of a piston, a screw-threaded piston-rod, a disk fixed to the rod, a spring pressing the piston and disk together, a hollow rod having slots in it surrounding the rod, means for driving the shaft, and a nut on the rod provided with wings engaging with the slots.

GUSTAV WALCH.

Witnesses:
 LOUIS KEHRMANN,
 WM. A. FLAITH.